United States Patent
Polvi et al.

(10) Patent No.: US 6,725,517 B1
(45) Date of Patent: Apr. 27, 2004

(54) METHOD FOR PLUGGING A HOLE AND A COOLING ELEMENT MANUFACTURED BY SAID METHOD

(75) Inventors: Veikko Polvi, Pori (FI); Tuija Suortti, Pori (FI)

(73) Assignee: Outokumpu Oyj, Espoo (FI)

( * ) Notice: Subject to any disclaimer, the term of this patent is extended or adjusted under 35 U.S.C. 154(b) by 58 days.

(21) Appl. No.: 10/030,013

(22) PCT Filed: Jun. 20, 2000

(86) PCT No.: PCT/FI00/00554
§ 371 (c)(1),
(2), (4) Date: Dec. 28, 2001

(87) PCT Pub. No.: WO01/03873
PCT Pub. Date: Jan. 18, 2001

(30) Foreign Application Priority Data

Jul. 9, 2000 (FI) .................................................. 991574

(51) Int. Cl.⁷ ........................... B29C 73/00; B23P 6/00; B21D 53/02; B23K 35/34
(52) U.S. Cl. ................. 29/402.01; 29/402.09; 29/890.03; 29/890.031; 29/890.038; 29/890.043; 29/112.1; 148/24; 228/245; 228/246; 228/262.6; 228/262.61
(58) Field of Search ................. 228/245, 246, 228/253, 256, 165, 174, 190, 262.6, 262.61, 2.1, 112.1; 148/22–24; 165/170, 175; 29/890.03–890.038, 402.01, 890.04–890.043, 888.011, 402.09

(56) References Cited

U.S. PATENT DOCUMENTS

| | | | | |
|---|---|---|---|---|
| 3,710,473 A | * | 1/1973 | McElwain et al. ........... 166/175 |
| 3,996,070 A | * | 12/1976 | Fletcher et al. ............. 136/232 |
| 4,255,961 A | * | 3/1981 | Biltonen et al. ............... 374/11 |
| 4,290,195 A | * | 9/1981 | Rippere ........................ 29/837 |
| 4,393,565 A | * | 7/1983 | Wilson et al. ................. 29/423 |
| 4,577,380 A | * | 3/1986 | Warner ........................ 165/153 |
| 5,025,553 A | * | 6/1991 | Telco ........................... 29/852 |
| 5,127,969 A | * | 7/1992 | Sekhar .......................... 148/23 |
| 5,199,487 A | * | 4/1993 | DiFrancesco et al. ....... 165/168 |
| 5,325,913 A | * | 7/1994 | Altoz .......................... 165/287 |
| 5,386,628 A | * | 2/1995 | Hartman et al. ............ 165/170 |
| 5,547,517 A | * | 8/1996 | Iwai ............................. 148/24 |
| 5,557,837 A | * | 9/1996 | Thiard-Laforet et al. ... 228/165 |
| 5,876,795 A | * | 3/1999 | Goldsmith et al. ......... 427/226 |
| 5,895,561 A | * | 4/1999 | George ........................ 205/114 |
| 6,008,987 A | * | 12/1999 | Gale et al. ................... 361/700 |
| 6,414,835 B1 | * | 7/2002 | Wolf et al. .................. 361/302 |
| 2002/0021742 A1 | * | 2/2002 | Maskell et al. ............. 374/145 |
| 2002/0125297 A1 | * | 9/2002 | Stol et al. ................. 228/112.1 |

FOREIGN PATENT DOCUMENTS

GB    2 196 556         5/1988
JP    05-267099 A    * 10/1993

* cited by examiner

Primary Examiner—L. Edmondson
(74) Attorney, Agent, or Firm—Smith-Hill and Bedell

(57) ABSTRACT

A method for plugging a hole, particularly a hole provided in a cooling element, in which method a hole formed in a piece essentially made of mainly copper, for instance in the housing element of a cooling element, there is arranged a plug mainly made of copper. Between the side surface of the plug and the inner surface of the hole, there is arranged brazing agent with a melting temperature lower than that of the pieces to be joined together, and the junction area between the plug and the piece, such as the housing element of the cooling element, is heated at least up to the melting temperature of the brazing agent or to the vicinity thereof, whereafter the junction area is cooled. The invention also relates to a cooling element manufactured according to said method.

17 Claims, 2 Drawing Sheets

METHOD FOR PLUGGING A HOLE AND A COOLING ELEMENT MANUFACTURED BY SAID METHOD

Figure 2:
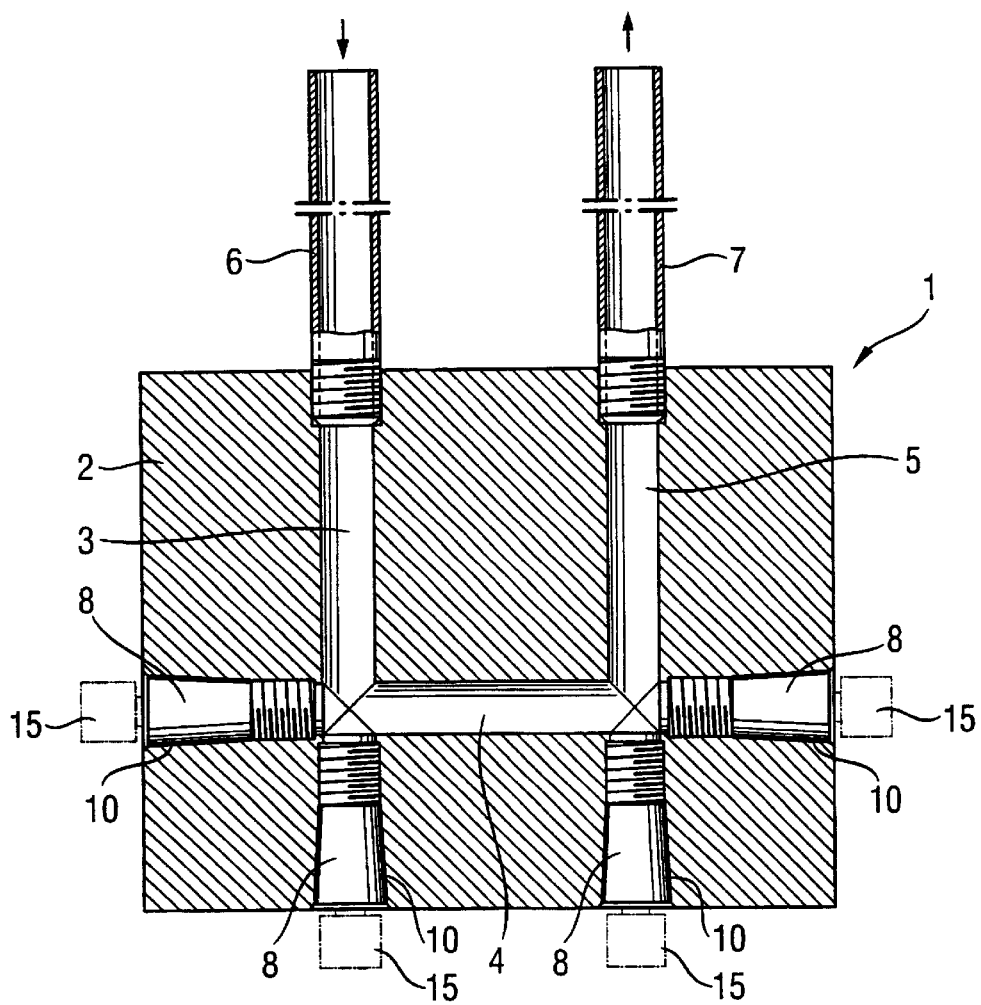

The present invention relates to a method for plugging a hole. The invention also relates to a cooling element.

In general, the invention relates to a method for plugging a hole, in which method, in a hole provided in an object essentially made of mainly copper, such as the housing element of a cooling element, there is inserted a plug mainly made of copper. Said holes to be plugged according to the object of the invention exist for example in cooling elements employed for cooling the structures of furnaces used in metal industry, such as flash smelting furnaces or blast furnaces used in steel industry, or in connection with the cooling channels of chutes used for conducting the molten metal. Typically the cooling elements are made of copper and provided with for example longitudinal and/or transversal channels where the cooling agent circulates. Part of the holes forming the cooling element channel system are plugged, so that in the element, there is left only a necessary amount of inlet holes through which the cooling agent is conducted into the element, and outlet holes through which the cooling agent is conducted out of said element. According to a known plugging method, the cooling element is provided with a plug that is arranged in the hole to be plugged by a pressed joint which is externally welded to the cooling element housing, typically with a weld that extends to the depth of about 6 mm. Prior to welding, the working pieces are preheated up to a high temperature. In the preheating step, the oxidizing risk of the plug joint is high, and at that point the prior art plugging joint is relatively vulnerable to damages caused by corrosion, among others. For instance the atmosphere prevailing in the furnace space of a flash smelting furnace and containing, among others, $SO_2$ gas, causes corrosion that proceeds as a sulphatizing reaction. In order to avoid the risk of damaging the plugging joint and possible leaking of the cooling agent as a result, it has been necessary to replace the cooling elements fairly often.

The object of the present invention is to realize a new method for plugging a hole, particularly the hole of a cooling element, whereby the drawbacks of the prior art are avoided. Thus another object of the invention is to realize a novel cooling element that has a longer working life than the prior art elements.

In the method according to the invention, between the plug side surface and the hole inner surface, there is arranged brazing agent with a melting temperature lower than the melting temperature of the parts to be joined together, and at least the junction area of the plug and the housing element of the object, such as the housing element of a cooling element, is heated at least up to the mewing temperature of the brazing agent or to the vicinity thereof, whereafter the juncture area is cooled. By means of the method according to the invention, there is achieved a joint that extends to a desired depth in the longitudinal direction of the plug. According to a preferred embodiment of the invention, the brazing agent is in the form of foil. In that case the brazing agent is in a form that is easy to handle, and it can be placed in the juncture exactly at the desired spot, so that the making of joints is carried out without difficulty.

According to an embodiment of the method according to the invention, the brazing agent is chosen from a group including as compounds Ag+Cu, Al+Cu, Sn+Cu and Sb+Cu. In the method according to the invention, the joint is made by applying a diffusion technique, where the components of copper or copper alloy and the brazing agent are partly dissolved on the contact surface. In this way, there is obtained an extremely high-quality joint. In the case of copper alloys, this is made possible by compositions that occur at least in the alloy systems Cu–Ag, Cu–Al, Cu–Sn and Cu–Sb, which melt at relatively low temperatures and are rich or even pure as regards the alloy components. Thus, in some embodiments it is possible to use for instance an exclusively Al-bearing foil. Moreover, the phase balances of said binary alloys can in the method be adjusted by moving over to ternary alloy balances (or balances of even more components). According to a preferred embodiment of the invention, the brazing agent has an eutectic composition with a given alloy composition with copper. By applying the brazing agents required for the diffusion joint in sufficiently thin, optimized layers, with diffusion mechanisms it is possible, even at low working temperatures, to obtain in the final structure solid phases that melt at a higher temperature, even by hundreds of degrees, than the original brazing agent. Thus the joint becomes, in a way, self-repairing, because it endures higher temperatures than the pure brazing agent would endure. The joining can be carried out for example by means of foil (brazing strip), or brazing wire; or else on the surfaces to be joined together, there can be used thin alloy material layers that are provided on said surfaces in advance. The heat required by the diffusion mechanisms between the brazing agent and the pieces to be joined together can be produced by heating with a heating means, for instance a liquefied gas burner. Other suitable heating arrangements for the heating of the juncture area can also be used, for example induction heating. If, in addition to the diffusion joint, in the junction there also is used surface welding of the plug, the welding temperature of the surface welding can be likewise be utilized when making the diffusion joint.

On the surface of the brazing foil and/or at least on one of the surfaces to be joined together, there is brought a layer of tin (Sn) prior to making the joint. The application of tin lowers the temperature required for making the joint. Moreover, the oxidation of the surfaces to be joined is avoided, and shielding gas arrangements are not needed in connection with making the joint. In order to start the phase transition reactions and to obtain an optimal seam structure, there suffices a tin layer of the order of a few micrometers between the Ag+Cu foil and the piece to be joined. The technique according to the method is not critical for the Ag+Cu composition, wherefore the use of an essentially pure Ag foil also is possible. The creation of the joint takes place rapidly, as a result of a diffusion of molten and solid materials as well as the successive phase transition reactions, already at the preheating temperatures prepared for the welding. By means of an application of the method according to the invention, it has been possible to create brazing agents that are well resistant to an atmosphere containing the gases present in the furnace space. For instance a brazing agent Ag+Cu endures well the $SO_2$ bearing atmosphere of a flash smelting furnace. With respect to corrosion taking place in the working conditions, the tin of the created mosaic gold is not harmful, because it is not sulphatized in similar fashion as zinc and copper. As for the silver that is dissolved in the phases of the junction seam, it improves the resistance to corrosion of the mosaic gold.

The invention also relates to a cooling element for furnaces, said element comprising a housing element mainly made of copper, and channels formed in said housing element for the cooling agent circulation; when forming said channels, in the housing element there are made holes that open on the surface thereof, and at least part of said holes are plugged. The invention is characterized in that the joint between the plug and the housing element is a diffusion joint. The cooling element according to the invention is extremely well resistant to the atmosphere prevailing in furnaces. The joint surfaces are mainly formed of the plug side surface and the hole inner surface. Thus the joint is made sufficiently long in the longitudinal direction of the plug. The joint is realized by using brazing foil arranged in between the joint surfaces. The plug comprises a threaded section and a conical joint section. By means of the threaded section, the joint surfaces are pressed together, so that a high-quality joint is formed. The joint section of the plug is made self-centering, so that the joint surfaces are set evenly against each other.

Figure 1:
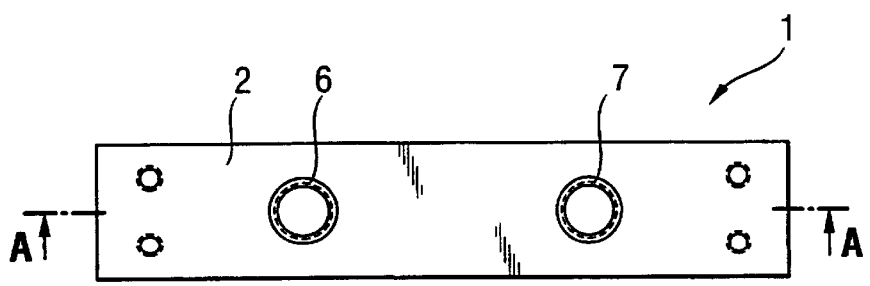
Figure 3:
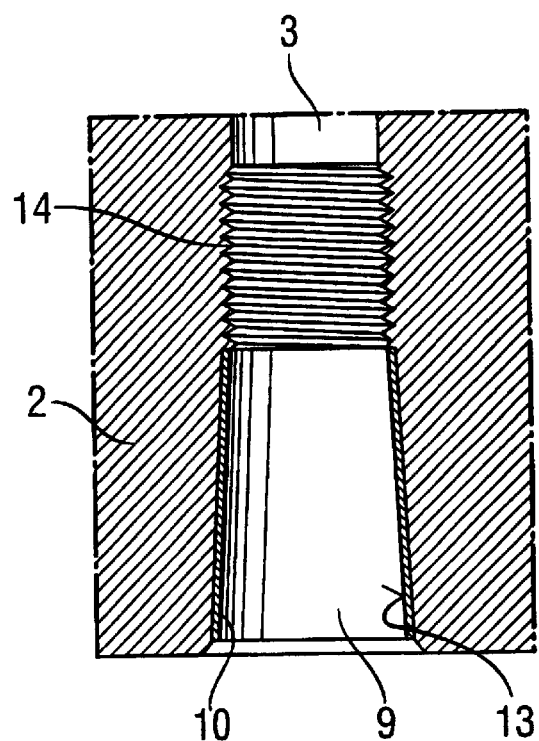
Figure 3:
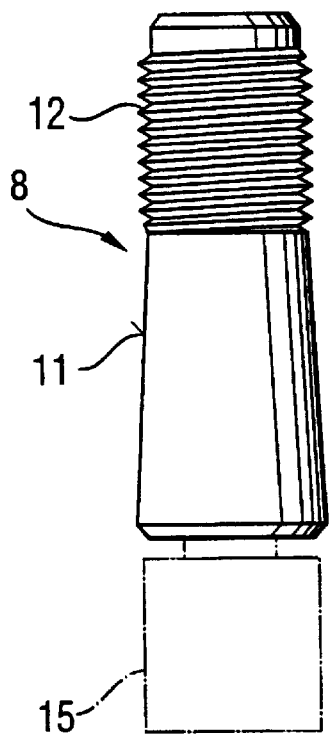

The invention is explained in more detail with reference to the appended drawings, where FIG. 1 is a simplified illustration of a cooling element, FIG. 2 illustrates the cooling element of FIG. 1 along the section A—A, and FIG. 3 illustrates a step of the method according to the invention, where the plug is soldered in a hole provided in the cooling element.

The invention relates to a method for plugging a hole, particularly a hole provided in a cooling element, in which method in a hole 9 provided in a piece consisting mainly of copper, said piece being for instance a housing element 2 of a cooling element 1, there is arranged a plug 8 consisting mainly of copper. FIG. 1 illustrates a cooling element 1 applying the plugging method according to the invention. Typically the cooling element 1 is made of copper. In the housing element 2 of the cooling element 1, there is for instance by drilling or casting made a channel system 3, 4, 5, wherein a cooling agent, such as water, circulates when the element 1 is installed in place in the furnace wall. In the example illustrated in the drawing, the channel system is made by forming holes 3, 4, 5 through the housing element 2. The holes 3, 4, 5 are arranged in the housing element 2 so that they are interconnected and thus form a channel system for the circulation of the cooling agent. Part of the holes 9 made in the surface of the housing element 2 are provided with plugs 8, so that only the necessary inlet and outlet conduits 6, 7 are left in the element, in order to connect the element to the cooling agent circulation. The cooling element 1 is attached to the furnace structures, for example to a wall, in which case it typically cools the fireproof lining of the furnace. Typically the cooling element wall on the side of the inlet and outlet conduits 6, 7 is directed outwardly with respect to the interior of the furnace (not illustrated). The material typically employed as the material of the cooling element is copper, owing to its good beat conductivity properties, among others. The cooling element illustrated in the drawings represents a simplified example of the structure of the cooling element. Typically the cooling element may contain several adjacent channels in the longitudinal and/or transversal direction of the element. In order to cool the furnace structures, there are used several cooling elements, which are connected to the cooling agent circulation.

In the method according to the invention for plugging a cooling element hole, where in a hole 9 provided in the housing element 2 of a cooling element 1, essentially made of mainly copper, there is arranged a plug 8 which is mainly made of copper, between the side surface 11 of the plug 8 and the inner surface 13 of the hole, there is arranged brazing/soldering agent 10 with a melting temperature lower than the melting temperature of the pieces that should be joined together, and at least the junction area of the plug and the cooling element is heated at least up to the melting temperature of a part of the brazing agent, or to the vicinity thereof, whereafter the junction area is cooled. By means of the method according to the invention, there is created a diffusion joint. The temperature can be raised so high that a momentary molten phase is created in the junction zone.

According to a preferred embodiment, the brazing agent 10 is in the form of foil. Foil is easy to handle, and when it is cut to a suitable width and length, it can be installed in advance at exactly the desired spot in the junction, in which case extremely good joints are achieved along the whole area of the junction surface. According to a typical embodiment, the brazing agent is brought to the hole 9 provided in the housing element 2 and/or to the junction surface 11 of the plug 8 prior to inserting the plug in the hole.

The brazing agent 10 is chosen from a group including the combinations Ag+Cu, Al+Cu, Sn+Cu and Sb+Cu. As regards the melting behavior, the brazing agent ingredients advantageously form eutectic compositions with copper. For instance with a brazing agent Ag+Cu, the eutectic composition includes 71% by weight Ag and 29% by weight Cu. The brazing agents can also be pure Ag or Al.

On the surface of the brazing agent foil 10 and/or at least one of the surfaces 11, 13 to be joined, there can be brought a layer of tin Sn, whereby the temperature required for brazing can be lowered. For instance, by applying on the surface of a Ag+Cu brazing agent foil with a thickness of 50 $\mu$m for example an Sn layer with the thickness of 5–10 $\mu$m, extremely high-quality joints have been achieved. The tin layers can be created for instance by immersing the foil-shaped brazing agent in molten tin, and when necessary, by thereafter smoothing the foil by rolling. In thickness, the brazing agent foil is typically 10–500 $\mu$m, advantageously 20–100 $\mu$m. When tin layers are used, the thickness in the middle section of the foil is 10–100 $\mu$m and in the surface sections 1–20 $\mu$m.

When a Sn layer is used in connection with the brazing, there can also be used a brazing agent where the Cu content is lower than the eutectic composition. For instance the Cu content of an Ag+Cu brazing agent can also be within the range 0–29% by weight. From the point of view of the method, the composition is not critical when tin layers are used.

In addition to brazing, the plug 8 can also be welded to the housing element 2 when so desired. In that case underneath the weld, in the brazing joint, the diffusion of tin and silver to copper continues, and as regards the phases created in the junction seam, the direction is towards phases that melt at higher and higher temperatures. Now the temperature required for the creation of a diffusion joint is reached already at the preliminary heating carried out for the welding process.

Consequently, the joint made according to the method of the invention between the plug 8 of the cooling element and the housing element 2 is a diffusion joint and produced by thermal treatment. The main junction surfaces are the side surface 11 of the plug 8 and the inner surface 13 of the hole. The plug comprises a threaded section 12 and a conical junction section 11. In shape the conical junction section 11 is a truncated cone that is narrowed towards the threaded section 12. The clearings provided in the threaded section allow the junction section 11 to be centered with the inner surface 13 of the hole.

FIG. 3 illustrates a step of the plugging method according to the invention in more detail. Typically the plug material is mainly copper. In the embodiment of the drawing, the plug 8 comprises a conical section 11 and a threaded section 12.

In the hole 9, there are formed counterparts for the e plug 8, i.e. a conical part 13 and a threaded part 14. In the situation illustrated in FIG. 3, in the vicinity of the inner wall of the hole 9, or in contact with the conical surface 13, there is arranged a brazing agent layer 10, most advantageously in the form of foil. Thereafter the plug 8 is inserted in the hole 9, so that the conical surface 11 of the plug and the conical surface 13 of the hole are set against each other, while the brazing agent layer 10 remains in between. The plug 8 according to the embodiment illustrated in the drawing is twisted to grip the threadings 14 of the hole. According to a preferred embodiment, the plug 8 can be provided with a drive device 15 which can be used for securing the plug in the hole, at a desired tightness by means of using said drive device. Thereafter the junction of the plug 8 and the housing element 2 is heated, so that a diffusion is created in the junction area.

A few preferred embodiments of the invention are illustrated in more detail in the following examples.

EXAMPLE I

In this example, the employed brazing agent was an Ag+Cu brazing agent having an eutectic composition and containing 71% by weight Ag and 29% by weight Cu. The brazing agent was In the form of foil, with a thickness of 50 $\mu$m. The foil was cut to a predetermined measure and set in the hole, against the inner surface thereof, prior to the plug. The plug was set in place, so that it was pressed against the brazing agent foil. The junction area was heated over the brazing agent melting temperature (779° C.), up to about 800° C., and the employed shielding gas was argon. The holding time was about 5 minutes. The joints according to the example succeeded in an excellent fashion. There was created a compact and unbroken joint. After the liquid contact has taken place, copper is dissolved in the brazing agent and vice versa, silver is diffused into copper. Thus the junction interface is completely crystallized anew.

EXAMPLE II

In this example, a copper piece was joined to another copper piece with an Ag–Cu brazing agent containing 71% Ag and 29% Cu. The brazing agent was in the form of foil having a thickness of 50 $\mu$m, and in addition, on the foil surface there was also formed a tin layer with a thickness of the order 5–10 $\mu$m. The temperature was raised up to about 600° C. The holding time was about 5 minutes. The junctions according to the example succeeded in an excellent fashion. There was created a compact and unbroken joint, where after the reaction time the tin, which originally was added as an essentially pure element, formed a mosaic gold seam with copper.

By using the method according to the invention, there can be joined copper and/or copper compounds with a typical copper content of at least 50%.

For a man skilled in the art, it is obvious that the invention is not restricted to the above described embodiments, but it can be modified within the scope of the appended claims.

What is claimed is:

1. A method for plugging, a hole in a cooling element, made of mainly copper, employing a plug mainly made of copper, characterized in that between the side surface of the plug and the inner surface of the hole, there is arranged brazing agent with a melting temperature lower than that of the pieces to be joined together, on the surface of the brazing agent and/or in at least one of the surfaces to he joined, there is provided a layer of tin, the plug is placed in the hole, and the junction area between the plug and cooling element is heated at least up to the melting temperature of the brazing agent or to the vicinity thereof, whereafter the junction area is cooled off, and wherein the plug comprises a conical junction part.

2. A method according to claim 1, characterized in that the brazing agent is brought to the hole provided in the housing element and/or to the junction surface of the plug prior to inserting the plug in the hole.

3. A cooling element for furnaces said element comprising a housing element mainly made of copper, and channels formed in the housing element for cooling agent circulation; when said channels were manufactured, in the housing element there were formed holes opening to the surface of said element, at least part of said holes being plugged, by a plug comprising a conical junction part, wherein the junction of the plug and the housing element is a tin containing diffusion joint.

4. A cooling element according to claim 3, characterized in that the junction surfaces are mainly formed of the plug side surface and the hole inner surface.

5. A method according to claim 1, characterized in that the brazing agent is in the form of foil.

6. A method according to claim 1, characterized in that the brazing agent is chosen from a group containing the combinations Ag+Cu, Al+Cu, Sn+Cu and Sb+Cu.

7. A method according to claim 1, characterized in that the brazing agent has, with a given alloy composition, an eutectic composition with copper.

8. A method according to claim 1, characterized in that the brazing agent is essentially Ag.

9. A method according to claim 1, characterized in that the brazing agent is essentially Al.

10. A method according to claim 1 characterized in that the thickness of the brazing agent foil is 10–500 $\mu$m, advantageously 20–100 $\mu$m.

11. A method according to claim 10, characterized in that the thickness of the foil in the middle section is 10–100 $\mu$m and in the surface layers 1–20 $\mu$m.

12. A method according to claim 1, characterized in that in addition to brazing, the plug is welded to the housing element.

13. A cooling element according to claim 3, characterized in that the plug comprises a threaded part and a conical junction part.

14. A cooling element according to claim 4, characterized in that the junction is formed by using a brazing agent foil arranged between the junction surfaces.

15. A cooling element according to claim 3, characterized in that the junction part of the plug is formed to be self-centering.

16. A cooling element according to claim 3, wherein the plug comprises a threaded part.

17. A method according to claim 1, wherein the plug comprises a threaded part.

* * * * *